United States Patent
Okita et al.

(10) Patent No.: US 7,835,395 B2
(45) Date of Patent: Nov. 16, 2010

(54) PACKET TRANSFER DEVICE

(75) Inventors: Hideki Okita, Kokubunji (JP); Toshiaki Suzuki, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 1116 days.

(21) Appl. No.: 11/257,035

(22) Filed: Oct. 25, 2005

(65) Prior Publication Data
US 2006/0092971 A1      May 4, 2006

(30) Foreign Application Priority Data
Oct. 29, 2004   (JP)   ............. 2004-316400

(51) Int. Cl.
H04J 3/22 (2006.01)
(52) U.S. Cl. .............. 370/468; 370/231; 370/236
(58) Field of Classification Search ......... 370/200–253, 370/272–309, 431–546; 709/203
See application file for complete search history.

(56) References Cited

U.S. PATENT DOCUMENTS

| | | | |
|---|---|---|---|
| 5,799,002 A * | 8/1998 | Krishnan | 370/234 |
| 7,047,311 B2 * | 5/2006 | Oishi et al. | 709/233 |
| 2001/0055305 A1 * | 12/2001 | Oz et al. | 370/389 |
| 2002/0199012 A1 * | 12/2002 | Cable et al. | 709/233 |
| 2003/0043846 A1 | 3/2003 | Purpura et al. | |
| 2003/0112752 A1 | 6/2003 | Irifune et al. | |
| 2005/0102427 A1 * | 5/2005 | Yokota et al. | 709/245 |
| 2005/0157644 A1 | 7/2005 | Johansson et al. | |

FOREIGN PATENT DOCUMENTS

| | | |
|---|---|---|
| EP | 1 365 546 A1 | 5/2002 |
| JP | 2002-135315 | 10/2000 |
| JP | 2003-186776 | 12/2001 |
| JP | 2003-338834 | 10/2002 |
| JP | 2004-289806 | 10/2004 |
| WO | WO 03/021890 A1 | 3/2003 |
| WO | WO 03/084157 A1 | 10/2003 |

OTHER PUBLICATIONS

Office Action from Japanese Patent Office, dated Jun. 2, 2009, in Japanese.
Office Action from Chinese Patent Office, dated Oct. 9, 2009, in Chinese.
Office Action from Japanese Patent Office mailed Mar. 2, 2010.

* cited by examiner

*Primary Examiner*—Ricky Ngo
*Assistant Examiner*—Iqbal Zaidi
(74) *Attorney, Agent, or Firm*—Stites & Harbison, PLLC; Juan Carlos A. Marquez, Esq.

(57) ABSTRACT

A router with a server incorporated to provide services has a problem in that the server's resource cannot be allocated dynamically according to user requests. Service request packets received at a plurality of network interfaces are controlled such that the total bandwidth of the service request packets does not exceed a preset threshold. This makes it possible to process as many service requests from users as possible while limiting a server resource occupied by one service to a fixed amount. The network interfaces are notified of how much of a server resource is occupied by each service. In the case where one service consumes less than its allocated resource amount, the resultant surplus resource is made available to other services by easing the bandwidth control on other services. The above problem is thus solved.

17 Claims, 13 Drawing Sheets

| FLOW IDENTIFIER | MAXIMUM BANDWIDTH | INTERFACE1 | | INTERFACE2 | | TOTAL SUM | |
|---|---|---|---|---|---|---|---|
| | | INPUT | OUTPUT | INPUT | OUTPUT | INPUT | OUTPUT |
| ID:1 | 30 | 75 | 25 | 15 | 5 | 90 | 30 |
| ID:2 | 40 | 0 | 0 | 10 | 10 | 10 | 10 |
| ID:3 | 50 | 0 | 0 | 70 | 50 | 70 | 50 |
| | | | | | | | |
| | | | | | | | |

462

UNIT: Mbps

FIG. 4

| FLOW IDENTIFIER | MAXIMUM BANDWIDTH | INTERFACE 1 | | INTERFACE 2 | | | | TOTAL SUM | |
|---|---|---|---|---|---|---|---|---|---|
| | | INPUT | OUTPUT | INPUT | OUTPUT | INPUT | OUTPUT | INPUT | OUTPUT |
| ID:1 | 30 | 75 | 30 | 0 | 0 | | | 75 | 30 |
| ID:2 | 40 | 0 | 0 | 0 | 10 | | | 10 | 10 |
| ID:3 | 50 | 0 | 0 | 70 | 50 | | | 70 | 50 |
| | | | | | | | | | |
| | | | | | | | | | |

| SERVICE TYPE | ALLOCATED RESOURCE | USED RESOURCE | MAXIMUM RESOURCE |
|---|---|---|---|
| HTTP | 60 | 60 | 90 |
| SIP | 40 | 10 | 40 |
| | | | |
| | | | |

*FIG. 12*

| FLOW IDENTIFIER | SERVER IDENTIFIER | SERVICE TYPE | ALLOCATED RESOURCE |
|---|---|---|---|
| ID : 1 | ID : 1 | HTTP | 60→90 |
| ID : 2 | ID : 1 | SIP | 40 |
| ID : 3 | ID : 2 | HTTP | 100 |
| | | | |
| | | | |

*FIG. 13*

| FLOW IDENTIFIER | MAXIMUM BANDWIDTH | INTERFACE 1 | | INTERFACE 2 | | TOTAL SUM | |
|---|---|---|---|---|---|---|---|
| | | INPUT | OUTPUT | INPUT | OUTPUT | INPUT | OUTPUT |
| ID:1 | 45 | 75 | 45 | 0 | 0 | 75 | 45 |
| ID:2 | 40 | 0 | 0 | 10 | 10 | 10 | 10 |
| ID:3 | 50 | 0 | 0 | 70 | 50 | 70 | 50 |
| | | | | | | | |
| | | | | | | | |

PACKET TRANSFER DEVICE

CLAIM OF PRIORITY

The present application claims priority from Japanese application P2004-316400 filed on Oct. 29, 2004, the content of which is hereby incorporated by reference into this application.

BACKGROUND OF THE INVENTION

This invention relates to a router constituting an IP (Internet Protocol) network. More specifically, the invention relates to a method and device to sort traffic by service type at a node between a server site and an IP network, thereby controlling the flow rate of each stream of traffic and ensuring a response to users for each service type.

A QoS (Quality of Service) function of a router is employed to ensure quality of respective services provided via a network. With the QoS function, packets of individual services are assigned their respective bandwidths on a connection line so that a high priority service can preferentially be delivered to users.

The QoS function is a function for per-flow bandwidth control and per-flow priority control. The term flow refers to a group of packets that have the same combination of a TCP (Transmission Control Protocol) or UDP (User Datagram Protocol) port number and a sender or receiver IP address. The QoS function can be used by both the input side network interface which receives a service request and the output side network interface which is connected to a server.

In the case where a single server providing a plurality of services receives and processes many packets of one of the services that is low in priority from users' point of view, the load of this service could take up most of the server's processing resource and lower the quality of other services that hold high priority for users. It is therefore desirable when a plurality of services shares a server's processing resource to give different priority levels to different services and preferentially deliver a high priority service to users.

For instance, consumption of an entire line bandwidth by a file transfer using FTP (File Transfer Protocol), which is employed for large-capacity file transfer, can be avoided by limiting a bandwidth that is occupied by FTP to 30% of the line bandwidth at maximum while allocating the rest to HTTP (Hyper Text Transfer Protocol), which is used as an interface of a service application, and to SMTP (Simple Mail Transfer Protocol), which is used to fetch e-mail.

To set a priority level to each service, a server-connected network interface of a router puts, through the QoS function, a limit to how much of a bandwidth is occupied by packets of each service and thereby indirectly limits how much of a server resource is occupied by each service.

A router has a control unit composed of a CPU and peripheral devices of the CPU. The control unit processes such route control protocols as OSPF (Open Shortest Path First) and BGP (Border Gateway Protocol), and provides a setting/management user interface using telnet or HTTP. As network services are diversified, a router is enhanced in function by incorporating a server that is composed of a CPU or a network processor, and software of the CPU or the network processor. The incorporated server is connected to a network interface via a switch interface that is located inside the router.

The QoS function of the router can be applied to the server incorporated in the router to ensure the quality of each service provided by the server. In this case, it will raise the cost of the router to provide every server with a mechanism for executing the QoS function.

In the case where an existing router configuration is employed to avoid an increase in cost, communication quality is ensured for each service by performing uniform, or utilization-history-basis, bandwidth control on a plurality of network interfaces that receives request packets from users.

SUMMARY OF THE INVENTION

This method of performing uniform or utilization-history-basis bandwidth control on network interfaces that receive request packets from users in order to limit the amount of service requests received by the server within a certain range raises the following problem: when the amount of service requests received from users varies from one network interface to another and there is a network interface that receives fewer service requests than its allocated limit, the surplus of the server's resource is wasted without being utilized by users connected via other network interfaces.

Take another example where a server in a router provides a plurality of services, each of which is allocated a maximum usable resource amount, and the amount of service requests received by a network interface at maximum is limited so that each service does not consume more of the server's resource than is allocated. In this case, when one of the services provided on the server consumes a fewer amount of resource than its maximum amount allocated, the balance makes a surplus resource. The surplus resource cannot be allocated to other services and the inefficient use of the server's resource is a problem.

A packet communication device of this invention includes: a plurality of interfaces for receiving packets from the outside; a server connected to the plurality of interfaces to provide a plurality of services to the outside; a switch interconnecting the interfaces and the server; and a bandwidth monitoring table used to manage the total amount of packets received by the plurality of interfaces, in which the packet communication device consults the bandwidth monitoring table to control the amount of packets to be relayed from each network interface to the server.

With this configuration, the amount of packets inputted via a plurality of interfaces to a server that provides services can be monitored and the monitored packet amount can be reflected on QoS control.

The plurality of interfaces may each have a bandwidth monitoring table and notify its own received packet amount to other interfaces, so that the amount of packets received by each of the plurality of interfaces is stored in the bandwidth monitoring table and the sum of the packet amounts is calculated.

The bandwidth monitoring table preferably has an entry composed of a flow identifier, a maximum bandwidth of a flow identified by the flow identifier, an input bandwidth and output bandwidth of the flow at each network interface, and a total input bandwidth and total output bandwidth of the flow at all the network interfaces. This way, the amount of data to be processed can appropriately be controlled for each service.

The packet communication device preferably further includes a service information registration table, in which the service information registration table has an entry composed of a flow identifier, a server identifier, a service type, and an allocated resource, and the entry shows how much of a resource of a server identified by the server identifier is allocated to a service provided by the server and identified by the service type, and shows which flow having a flow identifier is processed by this service.

Furthermore, a server's resource can be utilized efficiently if the server monitors the resource utilization state of each service and updates an allocated resource in the service information registration table according to the resource utilization state.

The packet communication device can further includes a maximum bandwidth calculating table, in which the maximum bandwidth calculating table has an entry including a flow identifier and a resource ratio, and when adding an entry of one flow to the bandwidth monitoring table, the packet communication device consults the maximum bandwidth calculating table to set a maximum bandwidth of the flow, thereby efficiently using the source.

The server resource management function unit, which, in the above example, is provided in a network interface, may be placed outside of the network interface. Here, the server resource management function unit has a bandwidth monitoring table and the plurality of interfaces notifies the server resource management function unit of its own received packet amount. Thus the bandwidth monitoring table can accumulate the amount of packets inputted at the respective interfaces and the sum of the packet amounts can be calculated.

Desirably, the bandwidth monitoring table manages, for each flow corresponding to a given service that is provided by a given server, the total amount of packets received at the plurality of interfaces. This way, the amount of data to be processed can appropriately be controlled for each service and a server resource can be used efficiently.

A communication device according to another aspect of this invention includes: a plurality of interfaces for receiving data from users through an input line; an output line connected to a server connected to the plurality of interfaces for providing a plurality of services; and a server resource management function unit for managing, for each flow corresponding to a given service that is provided by a given server, the total amount of data received at the plurality of interfaces, in which the communication device controls for each flow the amount of data outputted to the output line from the plurality of interfaces.

Here, the server resource management function unit can manage a maximum bandwidth for each flow corresponding to a given service that is provided by a given server, and the communication device can keep the amount of data outputted from the plurality of interfaces for a given service that is provided by a given server equal to or smaller than the maximum bandwidth.

Further, the server resource management function unit can receive from the server a utilization state of the server's resource, and changes the maximum bandwidth in a manner that reflects the server resource utilization state.

A communication method of this invention is characterized in that, when data from users is received at a plurality of interfaces and outputted via the interfaces to a server providing a plurality of services, the total amount of data received at the plurality of interfaces is managed for each flow corresponding to a given service that is provided by a given server, and that the amount of data outputted from the plurality of interfaces to an output line is controlled for each flow. This invention solves the following problems of prior art:

(1) That users connected via network interfaces cannot use a surplus resource created in a server; and (2) That a server resource is not used efficiently since a surplus resource cannot be allocated to other services.

Problem (1) is solved by a router of this invention in which a server connected to an internal switch interface notifies, directly or via a router control unit, the server resource management function of every network interface of a maximum usable resource for each service the server provides.

The server resource management function of a network interface has a function of holding a maximum usable resource amount of each service in association with a server identifier. The server resource management function also has a function of calculating, from a an average occupied bandwidth per resource which is determined for each service type, a bandwidth of user requests processible without exceeding the maximum usable resource amount, and holding the obtained bandwidth in association with a service identifier.

The server resource management function also has a function of holding a bandwidth of service requests received at each network interface of the router from user terminals, and managing, for each service, the total bandwidth of service requests received at all the network interfaces.

An interface-to-interface coordination function of a network interface has a function of notifying an interface-to-interface coordination function of another network interface of a bandwidth of service requests received at the network interface from user terminals which is held by the server resource management function.

In the case where the total bandwidth of requests for a service received at all the network interfaces exceeds a maximum bandwidth set to this service in advance, the server resource management function makes an adjustment to contain the amount of service requests within a set limit by discarding corresponding packets in the network interface. Packets are discarded at a uniform rate throughout all network interfaces or in an order of priority set in advance to the network interfaces.

Problem (2) is solved by a router of this invention in which a server resource monitoring function monitors a plurality of services on a server connected to an internal switch interface of the router. The server resource monitoring function monitors a server processing resource amount occupied by each of the plurality of services on the server, holds an occupied processing resource amount in association with a service identifier, and notifies a maximum transaction count notifying function of the occupied processing resource amount.

The maximum transaction count notifying function has a function of holding a maximum transaction count in association with a service identifier, and notifying every network interface of the maximum transaction count. To calculate a maximum transaction count for each service, a surplus server resource is obtained by choosing, for each service, a smaller one of a service's currently occupied processing resource amount and least ensured resource amount, and subtracting the sum of the values of the chosen one from the total server resource.

The surplus resource is allocated to the services at a ratio set in advance. With the use of a server resource ratio consumed in transactions which is averaged for each service, a surplus resource of each service is converted into a transaction count increasable for each service. The current transaction count is added to the converted transaction count, and thus obtained is the maximum transaction count of each service.

A flow control unit of a network interface holds a notified maximum transaction count of each service in association with a flow detection condition, which is set for each service. Detecting a flow that meets the condition, the flow control unit instructs a packet processing unit or a packet transferring unit to discard packets so that the flow is kept under the preset maximum transaction count.

This invention improves service quality to the maximum extent within a server resource range by collecting a surplus resource from every portion of a server and allocating the surplus resource to services that are executed on the server while ensuring that a necessary server resource amount is allocated to each service.

BRIEF DESCRIPTION OF THE DRAWINGS

FIG. 4 shows a bandwidth monitoring table held by a server resource management function of a network interface.

FIG. 10 is a diagram of a bandwidth monitoring table showing an example in which a service request flow from one of network interfaces stops.

FIG. 12 shows a resource utilization state management table held by a server.

FIG. 13 shows a service information registration table of when resource monitoring is performed in a server.

FIG. 14 shows a bandwidth monitoring table of when resource monitoring is performed in a server.

DETAILED DESCRIPTION OF THE PREFERRED EMBODIMENTS

Embodiments of this invention will be described below with reference to the accompanying drawings.

Figure 1:
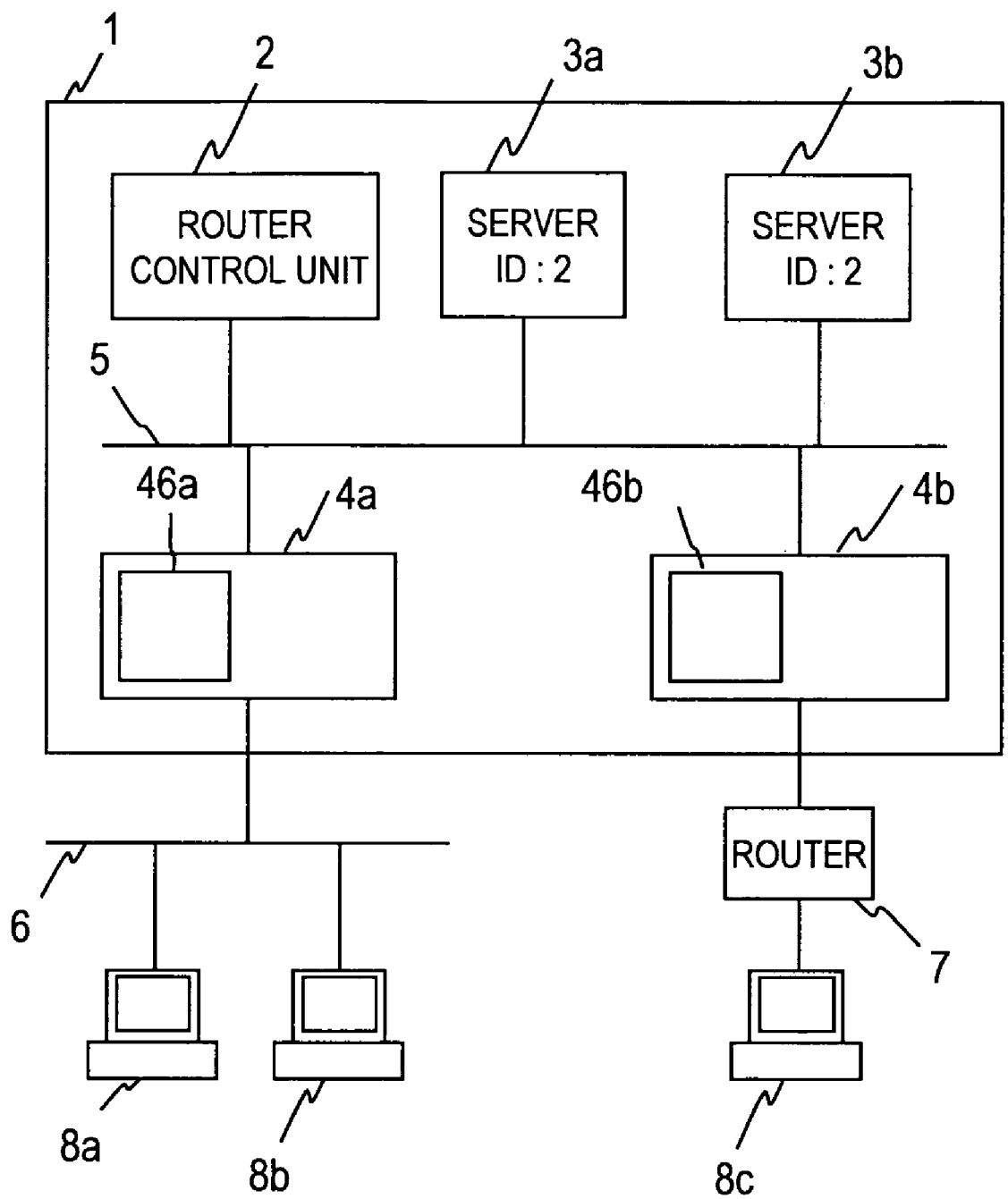
FIG. 1 is a schematic diagram showing an example of the configuration of a router according to this invention.

FIG. 1 is a schematic diagram of a router according to this invention. A router 1 of this invention is composed of a router control unit 2, one or plurality of servers 3a and 3b, and network interfaces 4a and 4b, which are connected to one another by an internal switch interface 5. Each server can provide a plurality of services. Via a switch network 6 or a network constituted of a router 7, the router 1 of this invention receives service requests from a plurality of user terminals 8a to 8c. One of the servers 3a and 3b that is designated by a received service request processes the service request, and responds to a user terminal 8a to 8c that has sent the service request.

In the router 1 of this invention, a server resource management function of the network interfaces 4a and 4b, which will be described later, manages resource allocation of each service and service requests from users. The server resource management function allocates a resource to each service in a manner that ensures quality for each service by limiting users' requests for a service received at a network interface to an amount that prevents the service from consuming more of the server's resource than its set threshold.

Figure 2:
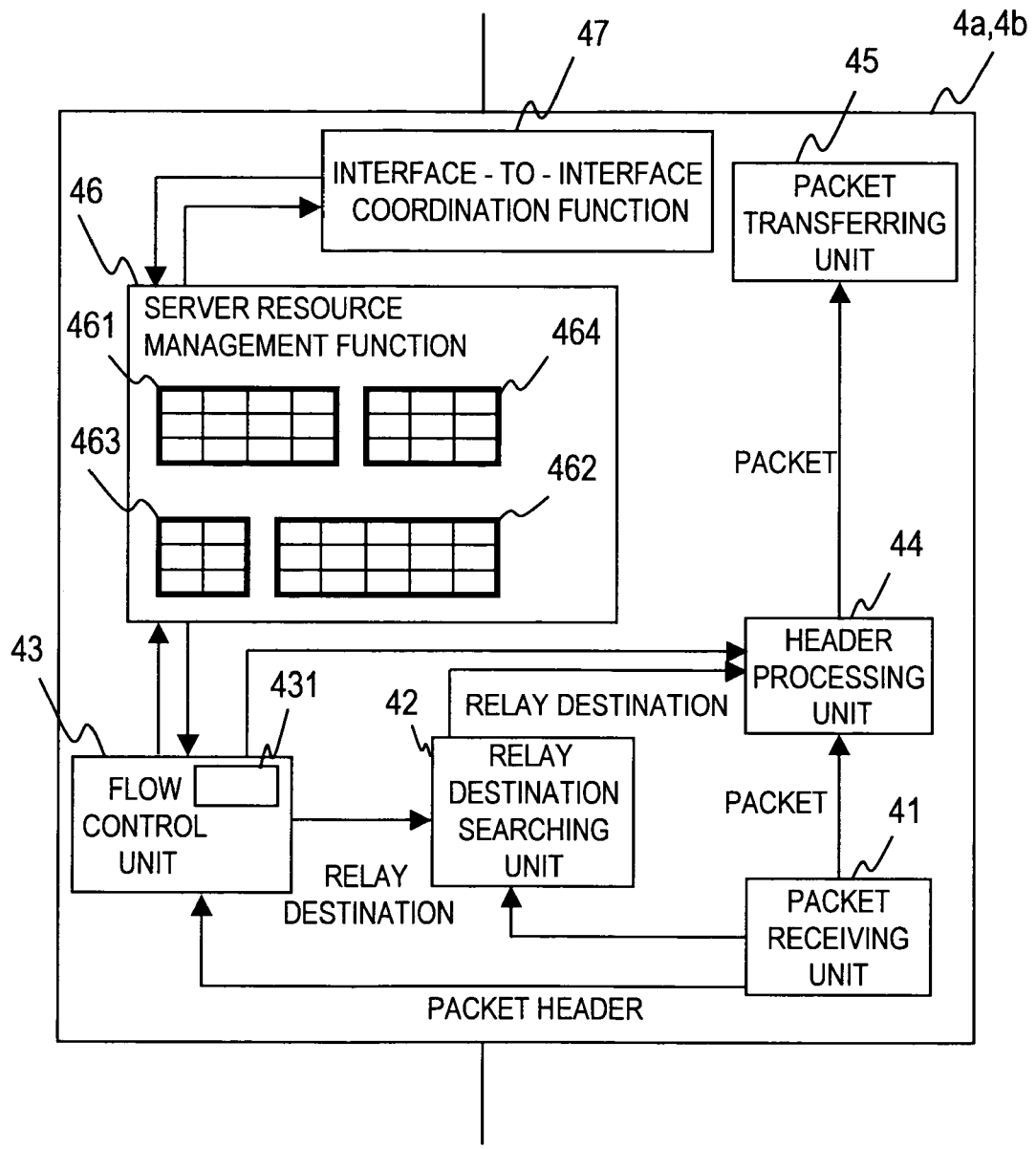
FIG. 2 is a schematic diagram showing an example of the configuration of a network interface for a router according to this invention.

FIG. 2 is a schematic structural diagram of the network interfaces 4a and 4b according to this invention. The network interfaces 4a and 4b each have a packet receiving unit 41, which receives packets from an external connection line, a relay destination searching unit 42, which searches for a destination to which a packet is relayed, a flow control unit 43, which performs bandwidth control, priority control, and the like on a flow set in advance, a header processing unit 44, which adds a relay destination header to a packet, and a packet transferring unit 45, which sends, to the switch interface in the router, a packet with a relay destination header added, and a server resource management function 46 (46a or 46b, shown in FIG. 1) and an interface-to-interface coordination function 47, as well. The packet receiving unit 41, the relay destination searching unit 42, the header processing unit 44 and the packet transferring unit 45 handle a normal router's packet relaying processing.

Figure 7:
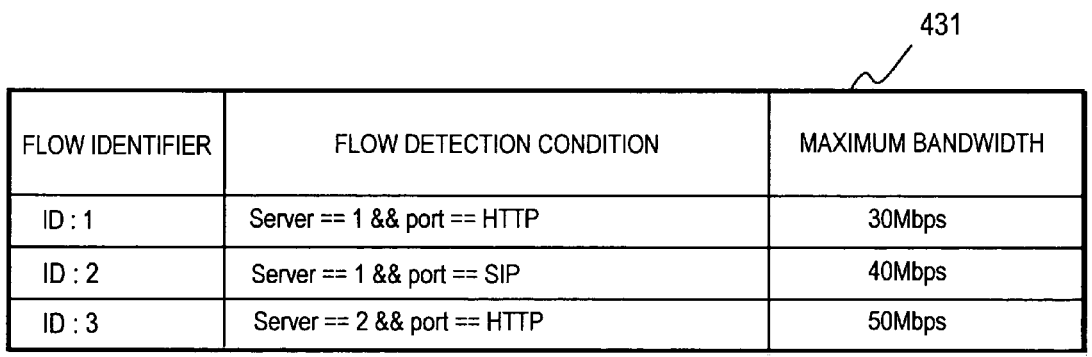
FIG. 7 shows a flow management table held by a flow control unit of a network interface.

FIG. 7 shows an example of a flow management table 431 that the flow control unit 43 has. The flow management table 431 has an entry composed of a flow identifier and a flow detection condition, which is a combination of a packet sender or receiver IP address and a TCP or UDP port number. The flow control unit 43 has a function of adding or deleting an entry of the flow management table 431 upon reception of a notification from the router control unit 2 or from the server 3a or 3b. The flow control unit 43 also has a function of instructing, when a received packet header is of a packet that is a subject of flow control, the header processing unit 44 to discard the packet or rewrite the packet header.

In the network interfaces 4a and 4b of this invention, the server resource management function 46 manages a maximum usable resource amount set to each service provided by the servers 3a and 3b. The flow control unit 43 performs bandwidth control on each flow according to the maximum usable resource amount, and the router 1 thus contains a resource amount consumed by each service of the servers 3a and 3b within a set limit.

Figure 3:
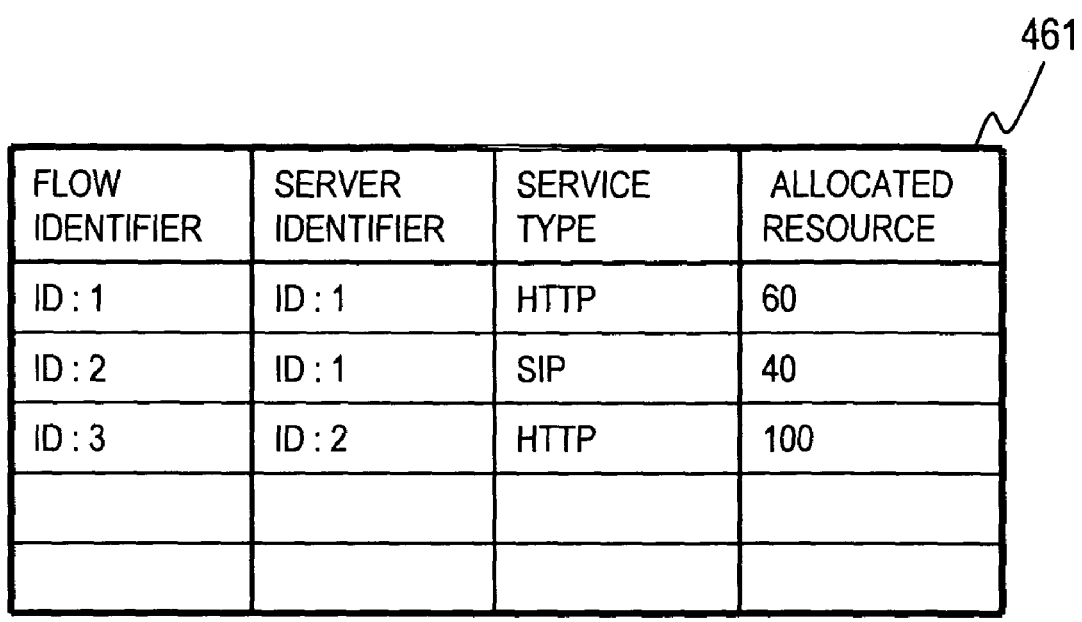
FIG. 3 shows a service information registration table held by a server resource management function of a network interface.

FIG. 3 shows a service information registration table 461 held by the server resource management function 46 of this invention. The service information registration table 461 has an entry composed of a flow identifier, a server identifier, a service type, and an allocated resource. Each entry shows how much of a resource a server allocates to a service of the server for use.

The server resource management function 46 has a function of adding, deleting, or updating an entry of the service information registration table 461 upon reception of a notification from the server 3a or 3b, or from the router control unit 2.

FIG. 4 shows a bandwidth monitoring table 462 held by the server resource management function 46 of this invention. The bandwidth monitoring table 462 has an entry composed of a flow identifier, a maximum bandwidth, an input bandwidth and output bandwidth of a corresponding flow for each network interface, and a total input bandwidth and total output bandwidth of corresponding flows for all network interfaces. The server resource management function 46 has a function of adding or deleting, an entry of the bandwidth monitoring table 462 in response to an addition or deletion of an entry of the service information registration table 461 upon reception of a notification from the server 3a or 3b, or from the router control unit 2.

The server resource management function 46 also has a function of notifying the flow control unit 43 in one network interface of components of an entry of the bandwidth monitoring table 462, namely, a flow identifier and a flow-by-flow maximum bandwidth to be set by this network interface. The flow control unit 43 has a function of setting, upon reception of the notification from the server resource management function 46, a maximum bandwidth to its assigned flow and thereby performing bandwidth control on the flow.

Another function of the server resource management function 46 is to update an entry of the bandwidth monitoring table 462 for a flow when notified of an input bandwidth of this flow by the flow control unit 43. Still another function of the server resource management function 46 is to forward, when notified by the flow control unit 43 of an input bandwidth of a flow for which an entry is kept in the bandwidth monitoring table 462, the notified input bandwidth to the interface-to-interface coordination function 47, and to receive an input bandwidth of this flow at other network interfaces.

Figure 5:
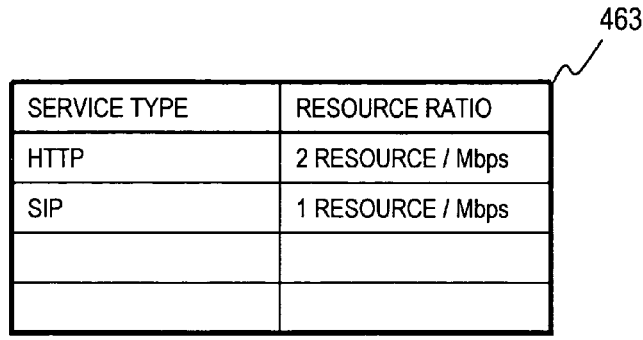
FIG. 5 shows a maximum bandwidth calculating table held by a server resource management function of a network interface.

FIG. 5 shows a maximum bandwidth calculating table 463 held by the server resource management function 46. The maximum bandwidth calculating table 463 has an entry composed of a service type and a numerical value for calculating the maximum bandwidth, for example, a resource ratio. The resource ratio represents how much of a server resource is consumed per unit bandwidth of a flow inputted to the server. Consider a case of adding an entry to the bandwidth monitoring table 462 about a flow that is registered in the service information registration table 461. An allocated resource of the registered flow is retrieved from the table 461. The table 463 is searched for an entry whose service type matches the service type of the registered flow, and a resource ratio is extracted from the found entry. The quotient of the allocated resource of the registered flow divided by this resource ratio is the maximum bandwidth allocated to the registered flow.

The server resource management function 46 has a function of adding or deleting an entry of the maximum bandwidth calculating table 463 upon reception of a notification from the server 3a or 3b, or from the router control unit 2.

Figure 6:
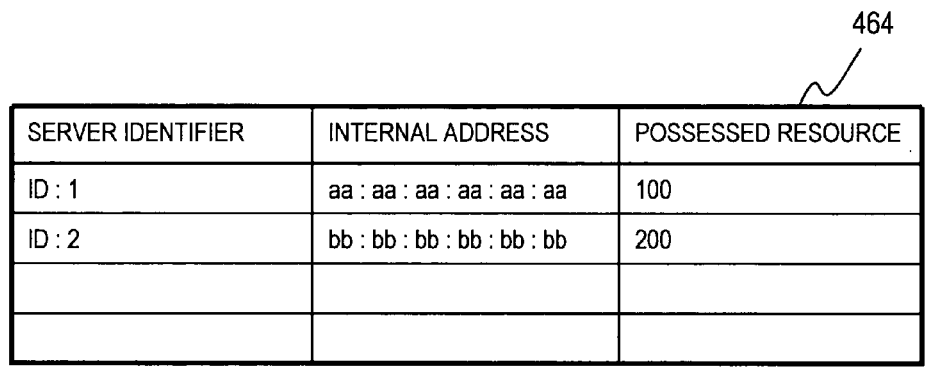
FIG. 6 shows a server information table held by a server resource management function of a network interface.

FIG. 6 shows a server information table 464. The server resource management function 46 holds the server information table 464 to use in distributing a surplus resource among a plurality of services provided by a server (distribution of a surplus resource will be described later). The server information table 464 has an entry composed of a server identifier, an internal address, and a resource possessed. The internal address refers to an address added as a part of an internal header to a packet that is to be transferred to a server identified by the entry's server identifier via an internal switch interface 5. The resource possessed refers to a resource owned by the server identified by the entry's server identifier.

The server resource management function 46 has a function of adding or deleting an entry of the server information table 464 upon reception of a notification from the server 3a or 3b, or from the router control unit 2.

An attempt to provide a high quality service via a network is sometimes hindered by a bottleneck in bandwidth of a connection line. To solve a bottleneck in a communication line and provide a high quality service in response to service requests from users, a server constituted of a CPU or a network processor is connected to a router via an internal switch interface of the router.

An increase in volume of service requests from users after the bottleneck in the communication line is solved may cause a bottleneck in a server's resource. In the case where the server is connected externally to the router, a network interface connected to the server puts a limit to how many service requests can be received from users through a flow control function, thereby containing the amount of a resource consumed by each service within a given range.

However, in the case of a server connected via a switch interface inside a router, the switch interface inside the router does not have the flow control function. Accordingly, every input side network interface has to use the flow control function to relay service requests from users to the server in an order of priority.

When input side network interfaces perform flow control, an uneven distribution of service requests from users among the network interfaces results in a surplus server resource.

The surplus server resource is desirably used to raise a set limit of a network interface that has received more user requests than the set limit and are prevented by flow control from receiving new user requests, for efficient allocation of the server's resource to user requests.

In this invention, the server resource management function 46 of each network interface manages the user request reception state of every network interface and controls the amount of user requests to be relayed to a server from each network interface according to the total amount of user requests. Thus, a resource amount set to each service is efficiently allocated to user requests.

Figure 8:
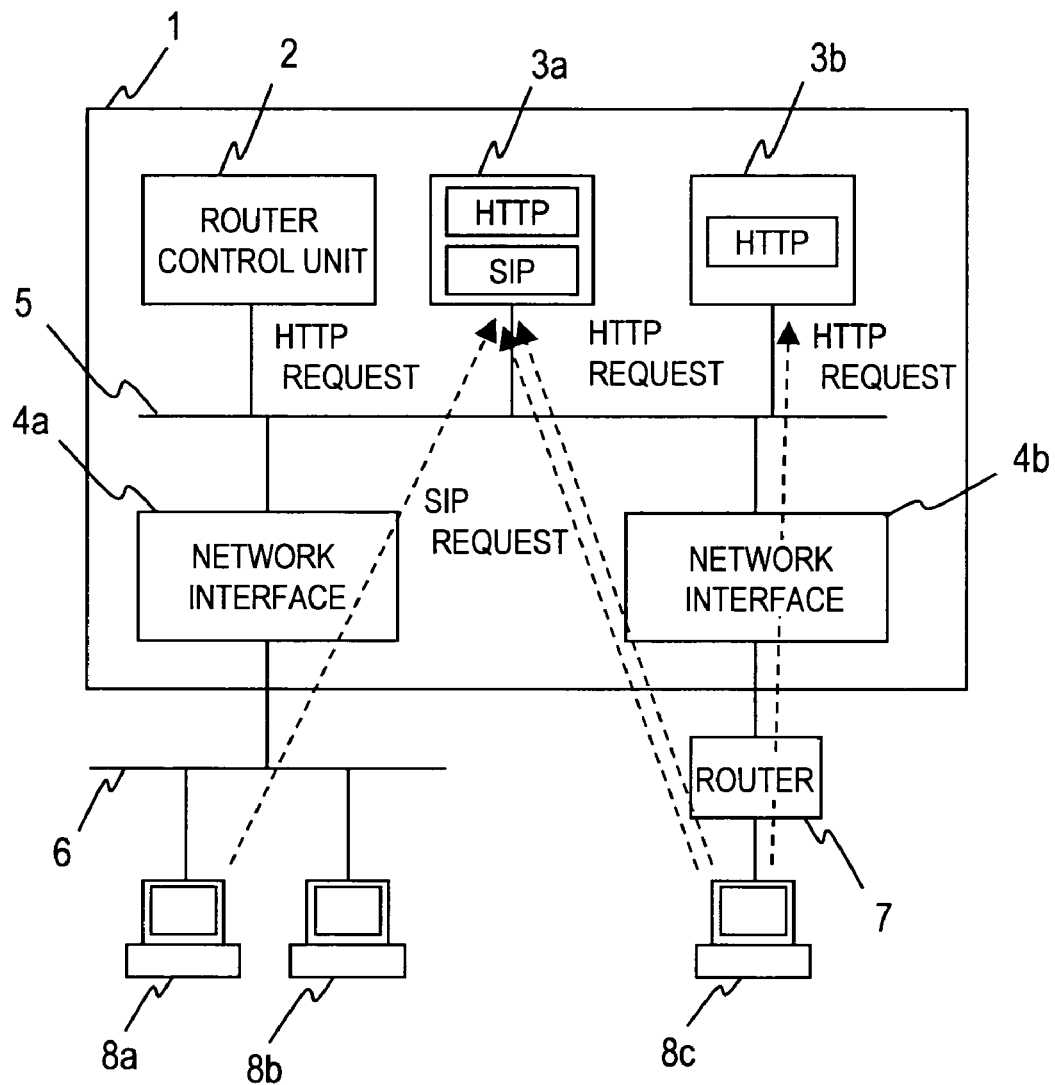
FIG. 8 is a schematic diagram showing an example of router configuration processing according to this invention.

FIG. 8 is a schematic diagram showing an embodiment of a service quality ensuring method according to this invention. Shown here is an example in which the user terminal 8a makes an HTTP service request to the server 3a, the user terminal 8c makes HTTP and SIP service requests to the server 3a, and the user terminal 8c makes an HTTP service request to the server 3b.

Services are activated on the servers 3a and 3b in the router 1, and then the servers 3a and 3b or the router control unit 2 notifies the server resource management function 46 of the network interface 4a and the server resource management function 46 of the network interface 4b of a server identifier, a service type, and an allocated resource for each service. Here, an HTTP service and an SIP service are activated on the server 3a and are allocated 60 parts of the resource and 40 parts of the resource, respectively.

At this point, the server resource management function 46 of each of the network interfaces 4a and 4b creates an entry in its own service information table 461 as shown in FIG. 3. As the flow identifier, different values are chosen for different entries. The server resource management function 46 simultaneously creates an entry in the bandwidth monitoring table 462 as shown in FIG. 4. Registered here in the bandwidth monitoring table 462 as a maximum bandwidth for each service is the product of an allocated resource in the service information registration table 461 and a corresponding resource ratio in the maximum bandwidth calculating table 463 of FIG. 5.

The server resource management function 46 further sets a flow detection condition to the flow control unit 43 in order to detect a packet for requesting a service that is registered in the service information registration table 461. A flow detection condition is made up of a server address and a TCP or UDP port number which are obtained by searching entries of the service information registration table 461 for a server identifier and a service type.

The user terminals 8a and 8c send service request packets directed to servers, and the service request packets are sent to the router 1 via the switch network 6 or via the router 7. The router 1 receives the packets at the network interfaces 4a and 4b. In each of the network interfaces 4a and 4b, the packet receiving unit 41 receives the packets to send the packets to the header processing unit 44 and to send packet headers to the relay destination searching unit 42 and the flow control unit 43.

The relay destination searching unit 42 searches for a relay destination address based on a receiver address in a packet header, and from the relay destination address, finds out to which network interface the packet is to be outputted. The relay destination searching unit 42 notifies the header processing unit 44 of the identifier of the found network interface as the relay destination. The header processing unit 44 stores, in an internal header, the relay destination notified by the relay destination searching unit 43, adds the header to the corresponding packet received from the packet receiving unit 41, and sends the packet to the packet transferring unit 45. The packet transferring unit 45 reads the internal header of the packet received from the header processing unit 44, and sends the packet to a network interface that is indicated by the relay destination stored in the internal header.

The flow control unit 43 reads the packet header received from the packet receiving unit 41, and consults its own flow management table 431 to judge whether or not the packet received at the network interface is to be a subject of flow control. The flow control unit 43 monitors the input bandwidth of service request packets for each service provided by the servers 3a and 3b according to entries of the flow management table 431. Finding as a result of the monitoring that an input bandwidth of a flow exceeds a maximum bandwidth indicated by the flow's entry in the flow management table 431, the flow control unit 43 instructs the header processing unit 44 to discard packets.

In order to limit the bandwidth of a flow of service request packets into a server by having the flow control unit 43 issue a packet disposal command, the server resource management function 46 monitors the input bandwidth of service request packets at every network interface.

First, the flow control unit 43 periodically notifies the server resource management function 46 of an input bandwidth of a flow for which an entry is kept in the flow management table 431. The server resource management function 46 overwrites corresponding entries of the bandwidth monitoring table 462 with the input bandwidth of each service at its network interface which is notified by the flow control unit 43.

Figure 9:
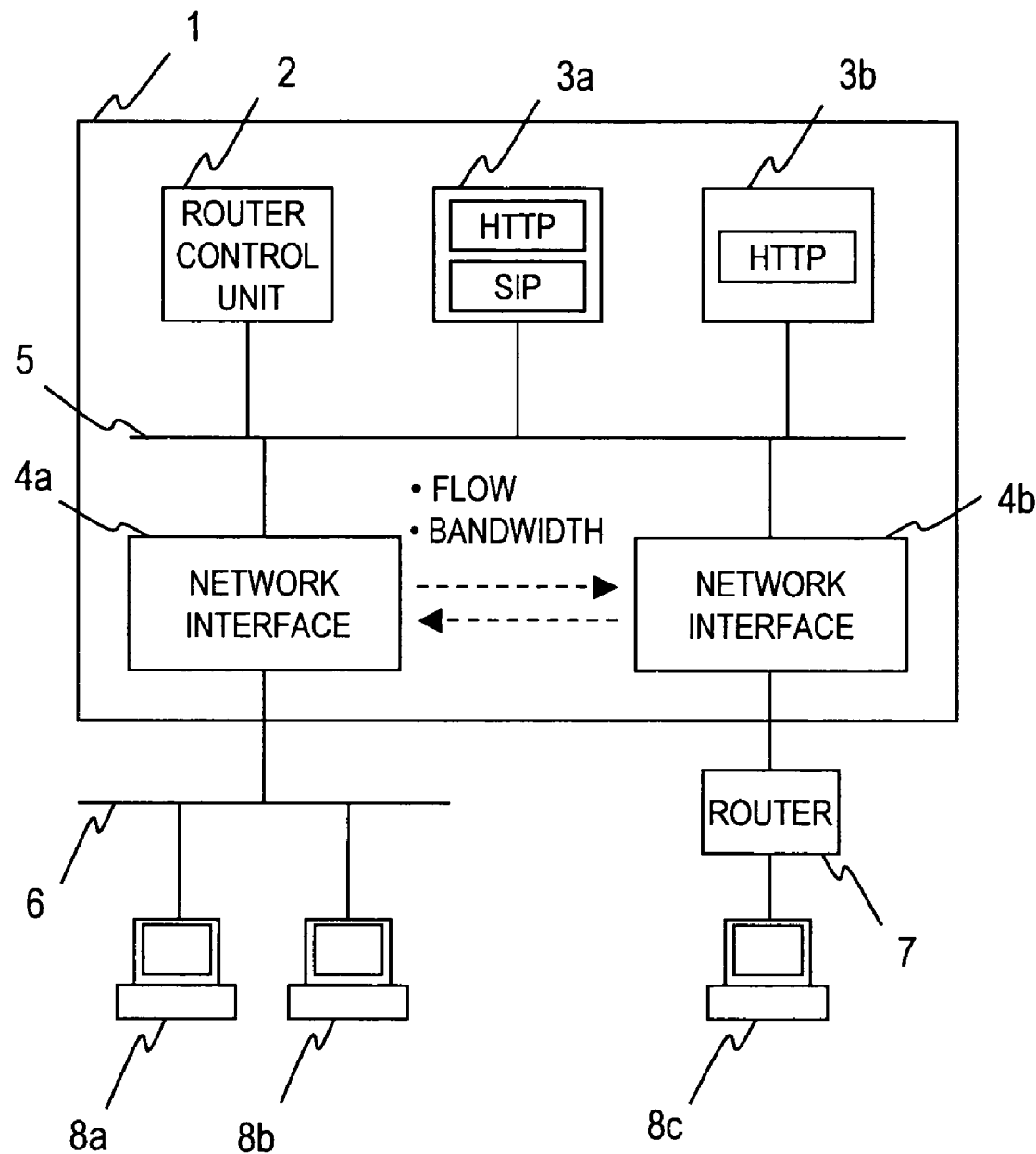
FIG. 9 is a schematic diagram showing an example of processing by a network interface of a router according to this invention.

FIG. 9 shows another embodiment.

As shown in FIG. 9, the interface-to-interface coordination function 47 receives, from another network interface, an interface identifier, a flow identifier, and an input bandwidth which are associated with one another. The received information is periodically forwarded to the server resource management function 46. The server resource management function 46 overwrites corresponding entries of the bandwidth monitoring table 462 with an input bandwidth of each service at other network interfaces which is periodically sent from the interface-to-interface coordination function 47.

The interface-to-interface coordination function 47 also attaches, as shown in FIG. 9, a network interface identifier to the input bandwidth of service request packets for each service which is notified by the server resource management function 46, and sends the input bandwidth with the network interface identifier to the interface-to-interface coordination function 47 of each and every other network interface than its own.

Referring again to FIG. 4, a description is given on functions of this invention.

The description here assumes that, as a result of compiling the input bandwidth of service request packets received for each service at every network interface, as shown in FIG. 4, the input bandwidth of a flow having a flow identifier 1 is registered in the bandwidth monitoring table 462 as 75 Mbps at the network interface 4a and 15 Mbps at the network interface 4b. Similarly, the input bandwidth of a flow having a flow identifier 2 is registered in the bandwidth monitoring table 462 as 0 Mbps at the network interface 4a and 10 Mbps at the network interface 4b, and the input bandwidth of a flow having a flow identifier 3 is registered in the bandwidth monitoring table 462 as 0 Mbps at the network interface 4a and 70 Mbps at the network interface 4b.

The flow having a flow identifier 2 does not receive bandwidth control at any network interface since this flow's total input bandwidth at all the network interfaces is 10 Mbps and is below a set maximum bandwidth, which is 40 bps.

As for the flow having a flow identifier 3, the total input bandwidth at all the network interfaces is 70 Mbps and is over a set maximum bandwidth, which is 50 bps. The flow having a flow identifier 3 therefore receives bandwidth control at the network interface 4b and is limited to an input bandwidth of 50 Mbps. To implement the bandwidth control, the server resource management function 46 of the network interface 4b sets the maximum bandwidth to 50 Mbps in an entry that has a flow identifier 3 in the flow management table 431 of the flow control unit 43.

As for the flow having a flow identifier 1, the total input bandwidth at all the network interfaces is 90 Mbps and is over a set maximum bandwidth, which is 30 bps. The flow having a flow identifier 1 therefore receives bandwidth control at the network interfaces 4a and 4b and is limited to an input bandwidth of 30 Mbps in total. For instance, the input bandwidth is controlled at the same rate at every network interface. Then, the maximum bandwidth of this flow is set to ⅙ at each of the network interfaces 4a and 4b, namely, 25 Mbps and 5 Mbps. In this example, all users are treated equally. Alternatively, an order of priority is set to the network interfaces. For instance, most of a bandwidth may be allocated to the network interface 4a while the remainder is allocated to other network interfaces.

FIG. 10 shows another state of the bandwidth monitoring table 462. Shown here is an example of operation of when the user terminal 8c stops sending HTTP service requests to the server 3a. The server resource management function 46 of the network interface 4a collects, via the interface-to-interface coordination function 47, input bandwidths monitored by the flow control unit 43 of the network interface 4b. As a result, as shown in FIG. 10, 0 is entered as the input bandwidth of a flow having a flow identifier 1 at the network interface 4b in the bandwidth monitoring table 462 that the server resource management function 46 has.

The server resource management function 46 recalculates limit bandwidth values of network interfaces when the input bandwidths at other network interfaces are updated upon notification from the interface-to-interface coordination function 47.

Here, the limit bandwidth value is set to 30 Mbps at the network interface 4a and 0 Mbps at the network interface 4b since the input bandwidth is 75 Mbps at the network interface 4a and 0 Mbps at the network interface 4b. The input bandwidth of HTTP service request packets at the network interface 4a is increased from 25 Mbps to 30 Mbps. A reduction in input bandwidth at the network interface 4b creates in the server 3a a surplus resource, which is allocated to reception of service requests at the network interface 4a.

Thus, constant management of the total input bandwidth of service request packets at all the network interfaces makes it possible to allocate a surplus server resource, which results from the amount of received service request packets varying from one network interface to another, to reception of service requests at other network interfaces.

In the above example, the input bandwidth is reduced at the same rate at all of the plurality of network interfaces. With the server resource management function of this invention, it is also possible to preferentially allocate a server resource to service requests from one network interface by weighting the priorities of network interfaces.

The above embodiment maximizes the server resource utilization efficiency through flexible distribution of a surplus resource among the plurality of network interfaces which is achieved by allocating a fixed amount of usable server resource to each service provided on a server and by controlling the maximum bandwidth of each flow.

However, in the case of providing a plurality of services on a single server, the ratio of an actually consumed resource amount to an allocated resource amount may vary from one service to another. When one of the services is not using 100% of its allocated resource amount, an unused portion of the resource amount secured for this service makes a surplus resource. Desirably, the surplus resource is temporarily allocated to a service that has used up 100% of its allocated resource amount and is limited by bandwidth control in amount of service request packets received at a network interface.

In another example of this invention, a server monitors the resource utilization state of each service, notifies a server resource management function of a network interface of a surplus resource of each service, and updates the allocated resource according to the server resource utilization state. This way, a surplus resource of one service can be utilized by other services.

Figure 11:
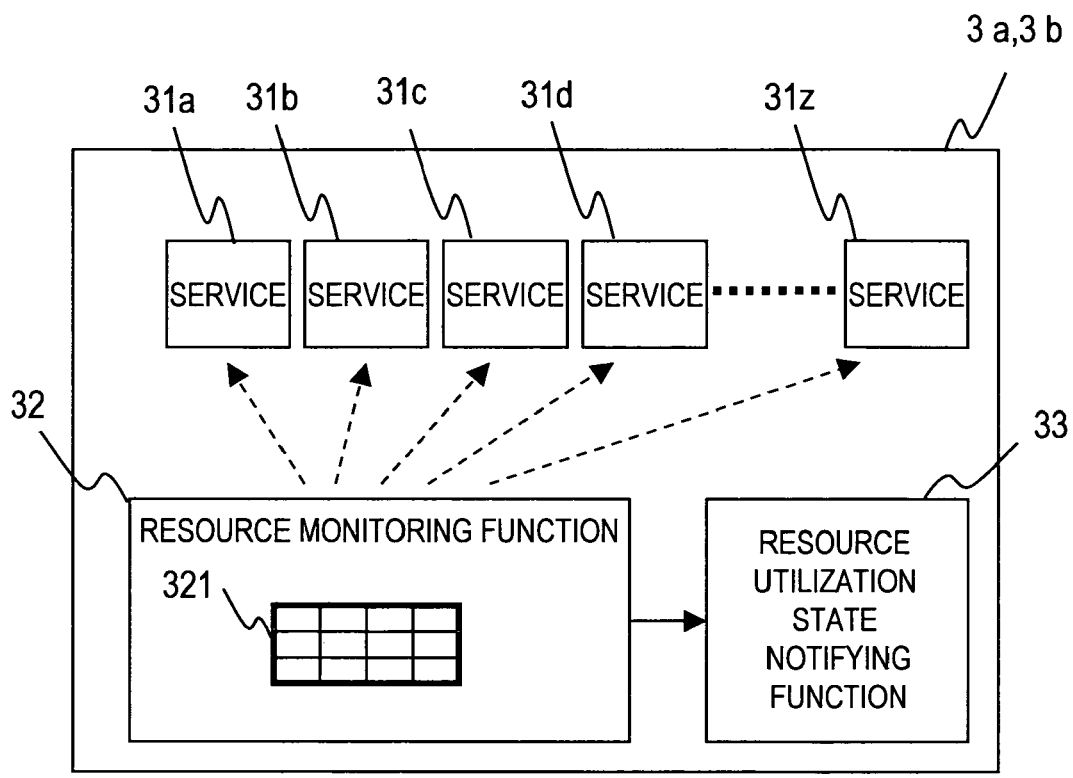
FIG. 11 is a schematic diagram showing an example of the configuration of a server that is provided in a router of this invention.

FIG. 11 is a schematic diagram of a configuration the servers 3a and 3b of this invention take to flexibly distribute a surplus resource of each service. The servers 3a and 3b each have a resource monitoring function 32, which monitors services 31a to 31z loaded in the form of a process and which holds information on how much of a server resource is occupied by each service. Also provided in each of the servers 3a and 3b is a resource utilization state notifying function 33, which notifies the network interfaces 4a and 4b or the router control unit 2 of the resource utilization state of each service collected by the resource monitoring function 32.

FIG. 12 shows a resource utilization state management table 321 held by the resource monitoring function 32 to manage the resource utilization state of each service. The resource utilization state management table 321 has an entry composed of a service type, an allocated resource, a used resource, and a maximum resource. The allocated resource refers to a resource amount allocated in advance to each service. The used resource refers to a resource amount actually used by each service. The maximum resource refers to a maximum resource amount allocated to each resource in a manner that makes most of the server's resource while keeping the total resource amount used by all services equal to or smaller than the server's resource.

Figure 15:
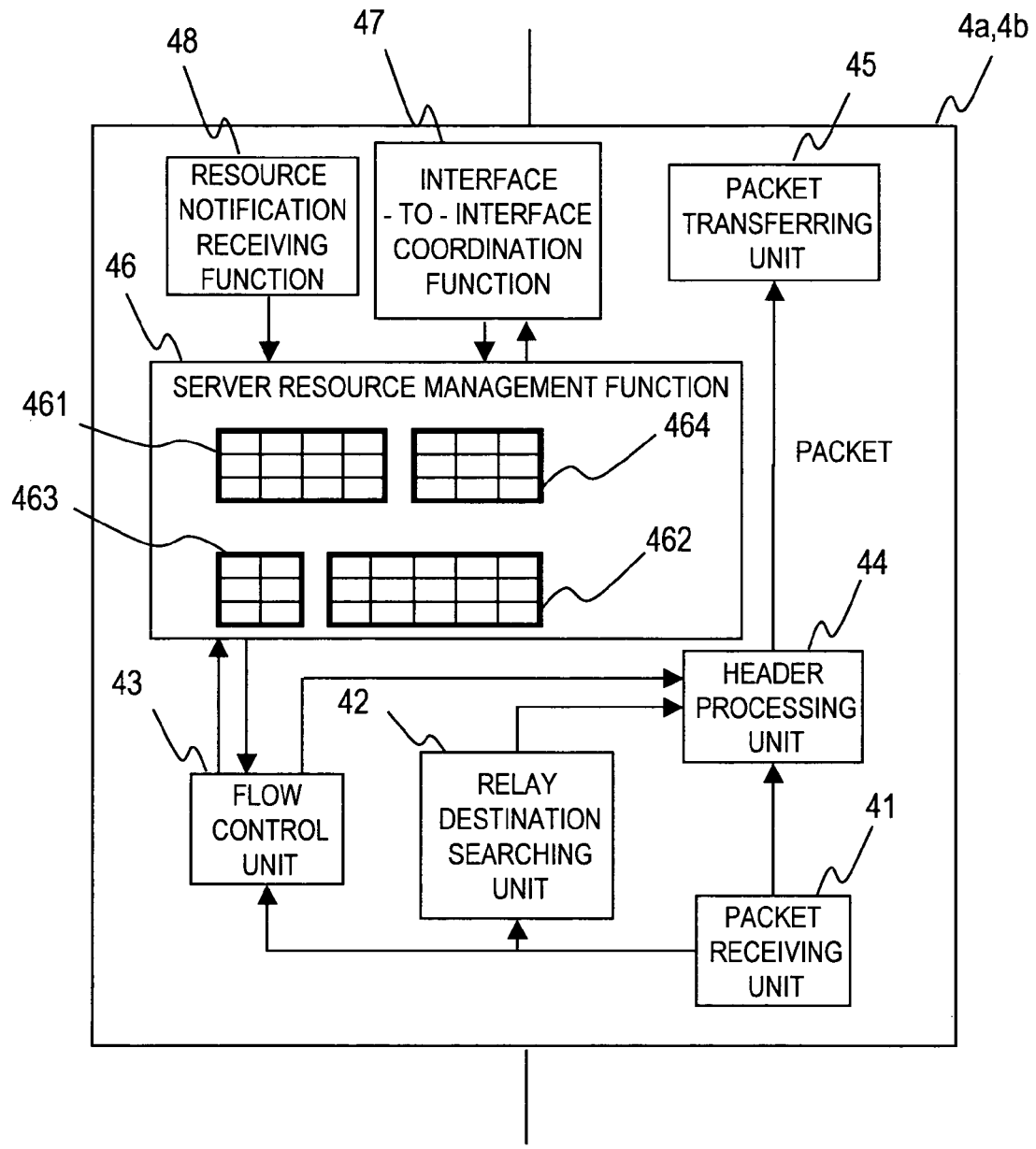
FIG. 15 is a schematic diagram showing an example of a network interface configuration of when resource monitoring is performed in a server according to this invention.

FIG. 15 shows a modification example of the network interfaces 4a and 4b modified so that resource monitoring is performed by a server. The network interfaces 4a and 4b each have, as in FIG. 2, the packet receiving unit 41, the relay destination searching unit 42, the flow control unit 43, the header processing unit 44, the packet transferring unit 45, the server resource management function 46, and the interface-to-interface coordination function 47. In FIG. 15, the network interface also has a resource notification receiving function 48 to receive a server resource utilization state notification from the server 3a or 3b or from the router control unit 2.

The resource notification receiving function 48 has a function of updating an allocated resource in the service information registration table 461 of the server resource management function 46 according to a server resource utilization state notified by the server 3a or 3b or by the router control unit 2.

The description here takes as an example a case where the server's resource is 100. 60 parts of the server resource are allocated to an HTTP service and 40 parts are allocated to an SIP service while the HTTP service actually uses 60 parts and the SIP service actually uses 10 parts. The input bandwidth of service request packets at each network interface in this example is as shown in FIG. 10.

FIG. 13 shows the service information registration table 461 of when resource monitoring is performed by a server.

The resource monitoring function 32 monitors the operation state of a process and as shown in FIG. 12, updates the resource utilization state management table 321. Then the resource monitoring function 32 notifies the network interface 4a or 4b or the router control unit 2 of a resource utilization state. The resource notification receiving function 48 of one of the network interfaces that has received the resource utilization state updates, as shown in FIG. 13, the service information registration table 461 of the server resource management function 46.

FIG. 14 shows an example of the bandwidth monitoring table 462 of when resource monitoring is performed by a server.

In response to an update of the service information registration table 461, as shown in FIG. 14, the server resource management function 46 updates the bandwidth monitoring table 462. The usable resource amount is increased to 90 parts for the HTTP service of the server 3a, and the increase expands the maximum bandwidth of HTTP service request packets received at the network interface 3a to 45 Mbps. The server resource management function 46 notifies the flow control unit 43 of this change, and the flow control unit 43 updates the flow management table 431 accordingly.

By thus monitoring the actual server resource utilization state to be notified to the server resource management function 46 and reflected on the flow management table 431 of the flow control unit 43, a surplus resource of one service can be allocated to other services.

Shown above are methods of flexibly distributing a surplus resource among the plurality of network interfaces or services while keeping a server resource consumed by each service provided on a server inside a router equal to or smaller than a given amount.

Figure 16:
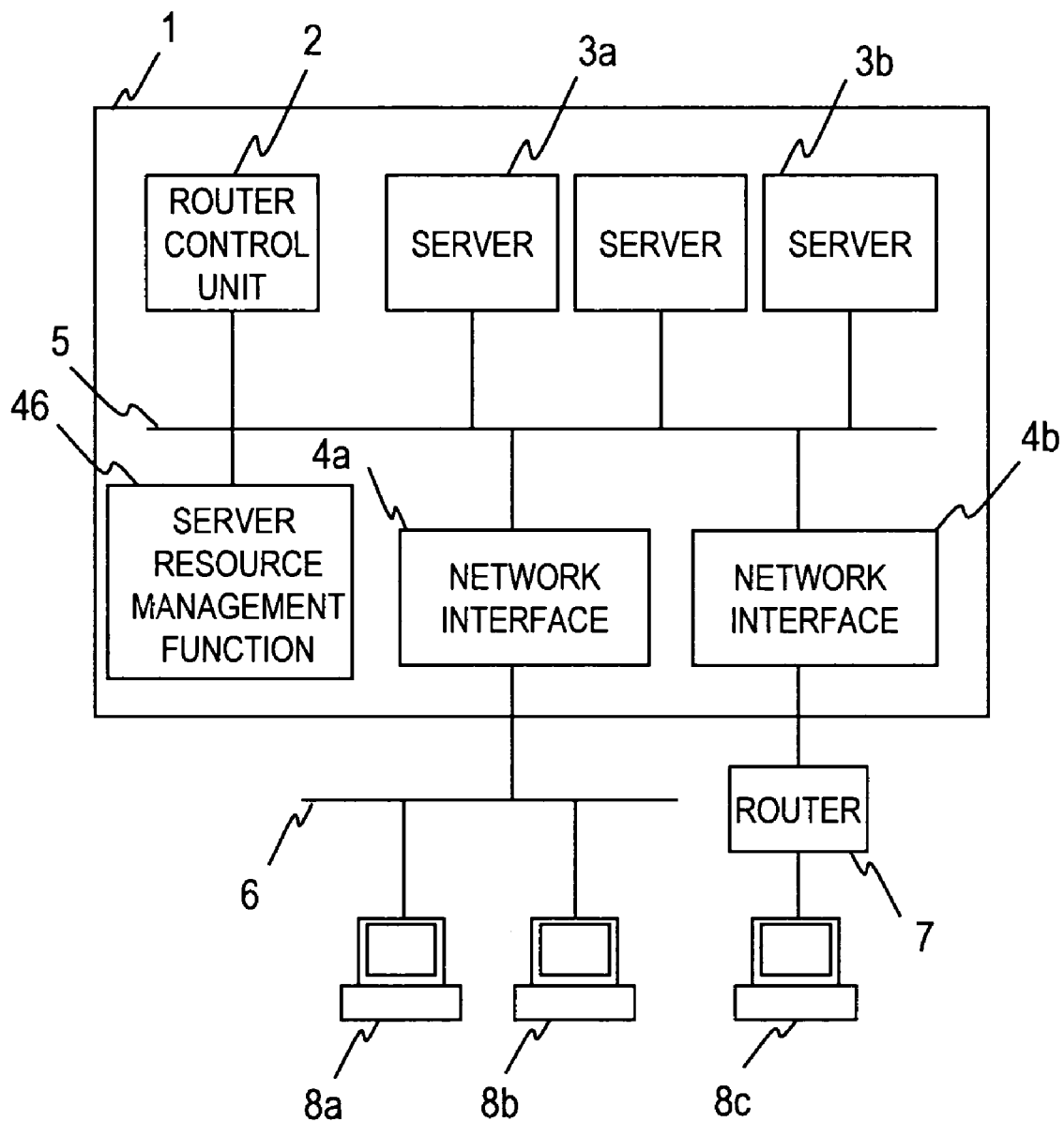
FIG. 16 is a schematic diagram showing an example of the configuration of a router according to this invention which has a server resource management function independent of a network interface.

FIG. 16 is a schematic diagram showing an example of the configuration of a router according to this invention that has a server resource management function independent of a network interface.

Whereas FIG. 15 shows an example of placing a server resource management function 46 inside a network interface 4a or 4b, FIG. 16 shows a mode of carrying out this method by placing a server resource management function 46 outside of a network interface 4a or 4b and connecting the server resource management function 46 to the network interface, a router control unit 2, and a server via an internal switch interface 5 of the router.

This invention, relating to a router that constitutes an IP network, will be employed to ensure the quality of a service provided on a network as more and more enhanced functions are demanded from networks in the future.

While the present invention has been described in detail and pictorially in the accompanying drawings, the present invention is not limited to such detail but covers various obvious modifications and equivalent arrangements, which fall within the purview of the appended claims.

What is claimed is:

1. A packet communication device comprising:
one or more servers for providing services to user terminals, the one or more servers being configured to monitor a respective server resource amount being utilized by each of the services;
one or more network interfaces for receiving packets through an external connection, the one or more network interfaces being configured to perform flow control including bandwidth control on received packets to be transferred to the server;
a router control unit for controlling the packet communication device;
an internal switch network interconnecting the one or more servers, the one or more network interfaces, and the router control unit; and
an input bandwidth manager for operating in conjunction with the one or more network interfaces to monitor a respective input bandwidth of service request packets received by the one or more network interfaces for each of the services and manage the bandwidth control performed by the one or more network interfaces according to a respective maximum input bandwidth of service request packets allocated for each of the services,
wherein the one or more servers calculate a respective surplus service resource amount for each of at least one of the services that is not fully utilizing a respective server resource limit set for the service and provide the respective surplus service resource amount for each of the at least one of the services to the input bandwidth manager, and
wherein the input bandwidth manager reallocates the respective maximum input bandwidths of service request packets for the services according to the respective surplus service resource amounts for the at least one of the services.

2. The packet communication device according to claim 1, wherein the one or more the network interfaces each comprise the following functions of:
monitoring a bandwidth occupied by service request packets which are received at the network interface for each service of each server;
transmitting to each of the other network interfaces the bandwidth occupied for each service of each server along with a network interface identifier, a server identifier, and a service type associated with the bandwidth occupied; and
receiving transmissions from each of the other network interfaces a bandwidth occupied by service request packets which are received at the transmitting network interface for each service of each server along with a network interface identifier, a server identifier, and a service type associated with the bandwidth occupied, and
wherein each network interface, upon recognizing changes in the bandwidth occupied for any service of any server, notifies the input bandwidth manager of the changes in the bandwidth occupied, and wherein the input bandwidth manager reallocates the respective maximum input bandwidths of service request packets for the services according to notifications of changes in the bandwidth occupied for the services received from the one or more network interfaces.

3. The packet communication device according to claim 2, wherein the input bandwidth manager maintains a maximum bandwidth calculating table having entries each composed of a service type and a resource ratio, the resource ratio of each entry representing an amount of a server resource that is consumed per Unit of input bandwidth received for the service corresponding to the service type, and
wherein the input bandwidth manager sets the respective maximum input bandwidth of service request packets allocated for each of the services by dividing the respective server resource limit set for the service by the resource ratio of the entry in the maximum bandwidth calculating table composed of the service type corresponding to the service.

4. The packet communication device according to claim 3, wherein the input bandwidth manager calculates the respective input bandwidth for each of the services by summing the service request packets received by each network interface for the service, and
wherein the input bandwidth manager obtains a respective preset ratio for each service of server input bandwidth for the service to input bandwidth of service request packets received for the service, and multiplies the respective preset ratio for each service by the respective input bandwidth of service request packets received by the one or more network interfaces for the service-to manage the bandwidth control performed by the one or more network interfaces in a manner that prevents a respective server input bandwidth limit for each service from exceeding a respective server input bandwidth limit for the service that is set in advance.

5. The packet communication device according to claim 3, wherein the input bandwidth manager calculates the respective input bandwidth for each of the services by summing the service request packets received by each network interface for the service,
wherein the router control unit comprises a function of setting a respective priority level for each network interface, and
wherein, upon the respective input bandwidth of service request packets received for any service of the services exceeds the maximum input bandwidth allocated for the service, the input bandwidth manager manages the bandwidth control performed by each of the one or more network interfaces according to the respective priority level for the network interface and the respective maximum input bandwidth allocated for the service.

6. The packet communication device according to claim 1, wherein the one or more network interfaces incorporate the input bandwidth manager.

7. A packet communication device comprising:
a plurality of interfaces receiving packets through an external connection;
a server connected to the plurality of interfaces to provide a plurality of services through the external connection;
a switch interconnecting the interfaces and the server; and
a bandwidth monitoring table maintained for monitoring, for each interface, a respective input bandwidth of service request packets received by the interface for each service,
wherein the packet communication device consults the bandwidth monitoring table to control an amount of service request packets relayed from each interface to the server by limiting the respective input bandwidth of service request packets received by the interface for each service according to respective maximum input bandwidths of service request packets allocated for the services, wherein the server calculates a respective surplus service resource amount for each of at least one service that is not fully utilizing a respective server resource limit set for the service and provides the respective surplus service resource amount for each of the at least one service to packet communication device, and wherein the packet communication device reallocates the respective maximum input bandwidths of service request packets for the services according to the respective surplus service resource amounts for the at least one service.

8. The packet communication device according to claim 7, wherein the plurality of interfaces each maintain a copy of the bandwidth monitoring table, and wherein each of the plurality of interfaces notifies each other interface of the plurality of interfaces of the respective input bandwidth of service request packets received by the interface for each service, stores the respective input bandwidth of service request packets received by each interface for each service in the bandwidth monitoring table maintained by the interface, and calculates a respective total input bandwidth for each service by summing the respective input bandwidth of service request packets received by each interface for the service.

9. The packet communication device according to claim 7, wherein the bandwidth monitoring table comprises entries each composed of a flow identifier, a maximum bandwidth of a flow identified by the flow identifier, an input bandwidth and output bandwidth of the flow at each interface, and a total input bandwidth and total output bandwidth of the flow at all the interfaces.

10. The packet communication device according to claim 9, further comprising a service information registration table, wherein the service information registration table comprises entries each composed of a flow identifier, a server identifier, a service type, and an allocated resource, and wherein each entry indicates how much of a server resource of the server identified by the server identifier is allocated to one of the services provided by the server and identified by the service type, and indicates a flow identified by the flow identifier that is processed by the service identified by the service type.

11. The packet communication device according to claim 10, wherein the server monitors a respective resource utilization state of each service and updates the allocated resource of the entry in the service information registration table having the service type identifying the service according to the respective resource utilization state of the service.

12. The packet communication device according to claim 9, further comprising a maximum bandwidth calculating table, wherein the maximum bandwidth calculating table comprises entries each including a flow identifier and a resource ratio, and wherein, upon adding an entry for a new flow to the bandwidth monitoring table, the packet communication device consults the maximum bandwidth calculating table to set the maximum bandwidth of the flow in the added entry.

13. The packet communication device according to claim 7, wherein a server resource management function unit is provided that is external to the plurality of interfaces, wherein the server resource management function unit comprises the bandwidth monitoring table, and wherein each of the plurality of interfaces notifies the server resource management function unit of the respective input bandwidth of service request packets received by the interface for each service, and the server resource management function accumulates the respective input bandwidth of service request packets received by each interface for each service in the bandwidth monitoring table and calculates a respective total input bandwidth for each service by summing the respective input bandwidth of service request packets received by each interface for the service.

14. The packet communication device according to claim 7, wherein the packet communication device consults the bandwidth monitoring table to manage a sum of the respective input bandwidths of service request packets received by the plurality of interfaces for each service according to the respective maximum input bandwidth of service request packets allocated for the service.

15. A communication device comprising:

a plurality of interfaces receiving data from users through an input line and outputting the received data to an output line connected to a server providing a plurality of services; and a server resource management function unit for managing, for each flow corresponding to a respective service of the plurality of services that is provided by the server, a respective total amount of data received at the plurality of interfaces and a respective maximum bandwidth, wherein the server monitors a respective server resource amount being utilized by each service of the plurality of services and calculates a respective resource utilization state for each service according to the respective server resource amount being utilized by the service and a respective server resource limit for the service, wherein the server resource management function unit receives from the server the respective resource utilization state of each service and updates the respective maximum bandwidth for each of at least one flow that corresponds to a respective service that is not fully utilizing the respective server resource limit for the service according to the respective total amount of data received at the plurality of interfaces for the flow and the respective resource utilization state of the respective service to which the flow corresponds, and wherein the communication device receives the updated respective maximum bandwidth for each of the at least one flow from the server resource management function and controls for each of the at least one flow a respective amount of data outputted to the server via the output line from the plurality of interfaces in accordance with the respective maximum bandwidth for the flow.

16. The communication device according to claim 15, wherein the communication device limits the amount of data outputted from the plurality of interfaces for each flow to be equal to or less than the respective maximum bandwidth for the flow.

17. The communication device according to claim 16, wherein the server resource management function unit updates the respective maximum bandwidth for each flow in accordance with the respective resource utilization state of the respective service to which the flow corresponds.

* * * * *